United States Patent
Huber et al.

(10) Patent No.: US 7,962,803 B2
(45) Date of Patent: Jun. 14, 2011

(54) APPARATUS, SYSTEM, AND METHOD FOR MULTI-ADDRESS SPACE TRACING

(75) Inventors: Harold Steven Huber, Tucson, AZ (US); Miguel Angel Perez, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/242,849

(22) Filed: Sep. 30, 2008

(65) Prior Publication Data

US 2010/0083052 A1 Apr. 1, 2010

(51) Int. Cl.
*G06F 11/00* (2006.01)
(52) U.S. Cl. ............................................ 714/45; 714/37
(58) Field of Classification Search ............... 714/34, 714/39, 45, 37
See application file for complete search history.

(56) References Cited

U.S. PATENT DOCUMENTS

| | | | |
|---|---|---|---|
| 4,598,364 A * | 7/1986 | Gum et al. ........... | 714/38 |
| 5,297,248 A | 3/1994 | Clark | |
| 5,802,272 A * | 9/1998 | Sites et al. ........... | 714/45 |
| 6,058,393 A * | 5/2000 | Meier et al. ........... | 1/1 |
| 6,134,676 A | 10/2000 | Van Huben et al. | |
| 6,182,243 B1 | 1/2001 | Berthe et al. | |
| 6,324,683 B1 * | 11/2001 | Fuh et al. ........... | 717/124 |
| 6,687,811 B1 * | 2/2004 | Yamada ........... | 712/227 |
| 7,120,685 B2 | 10/2006 | Ullmann et al. | |
| 7,200,776 B2 | 4/2007 | Harris | |
| 7,480,833 B2 * | 1/2009 | Billeci et al. ........... | 714/45 |
| 2002/0198983 A1 | 12/2002 | Ullmann et al. | |
| 2003/0212805 A1 * | 11/2003 | Motosaka et al. ........... | 709/228 |
| 2004/0221196 A1 * | 11/2004 | Datta et al. ........... | 714/13 |
| 2004/0268315 A1 * | 12/2004 | Gouriou et al. ........... | 717/129 |
| 2005/0060521 A1 | 3/2005 | Wang | |
| 2006/0242627 A1 | 10/2006 | Wygodny et al. | |
| 2007/0006159 A1 * | 1/2007 | Hecht et al. ........... | 717/124 |
| 2007/0220195 A1 * | 9/2007 | Kawaguchi ........... | 711/5 |
| 2007/0226544 A1 * | 9/2007 | Woodhouse ........... | 714/45 |
| 2008/0216087 A1 * | 9/2008 | Dillenberger et al. ........... | 718/105 |
| 2008/0307267 A1 * | 12/2008 | Chandrasekaran ........... | 714/38 |
| 2009/0077554 A1 * | 3/2009 | Reed et al. ........... | 718/101 |
| 2010/0218051 A1 * | 8/2010 | Walker et al. ........... | 714/45 |

FOREIGN PATENT DOCUMENTS

| | | |
|---|---|---|
| EP | 0463732 A2 | 1/1992 |
| JP | 3154134 | 7/1991 |

* cited by examiner

*Primary Examiner* — Bryce P Bonzo
(74) *Attorney, Agent, or Firm* — Kunzler Needham Massey & Thorpe (57) ABSTRACT

An apparatus, system, and method are disclosed for multi-address space tracing. A trigger module establishes a trigger event with a trace level. The trigger event occurs in at least a first address space of a plurality of address spaces. The trace level defines trace data to be stored from the plurality of address spaces. A monitor monitors messages communicated within and between the plurality of address spaces. A detection module detects the trigger event. A log module logs the trace data from the plurality of address spaces defined by the trace level in response to detecting the trigger event.

20 Claims, 6 Drawing Sheets

| Address Space ID 405a | Message 410a |
| Address Space ID 405b | Message 410b |
| Address Space ID 405c | Message 410c |
| Address Space ID 405d | Message 410d |

| Job ID 505a | Runtime 510a | Resources Used 515a |
| Job ID 505b | Runtime 510b | Resources Used 515b |
| Job ID 505c | Runtime 510c | Resources Used 515c |
| Job ID 505d | Runtime 510d | Resources Used 515d |

APPARATUS, SYSTEM, AND METHOD FOR MULTI-ADDRESS SPACE TRACING

BACKGROUND OF THE INVENTION

1. Field of the Invention

This invention relates to data tracing and more particularly relates to tracing data in multiple address spaces.

2. Description of the Related Art

Data processing devices often support storing trace data. For example, if a server is unable to communicate with the network, the server may store error messages relating to the communication failure in a trace log. Administrator may view the trace log to determine a root cause of the communication failure.

Unfortunately, in a data processing system trace data is often collected and stored without coordination among the various data processing devices in the system. As a result, much valuable information may be difficult to identify in trace logs.

SUMMARY OF THE INVENTION

From the foregoing discussion, there is a need for an apparatus, system, and method for multiple address space data tracing. Beneficially, such an apparatus, system, and method would store trace data for multiple address spaces in response to trigger data from multiple address spaces.

The present invention has been developed in response to the present state of the art, and in particular, in response to the problems and needs in the art that have not yet been fully solved by currently available data tracing methods. Accordingly, the present invention has been developed to provide an apparatus, system, and method for multi-address space tracing that overcome many or all of the above-discussed shortcomings in the art.

The apparatus for multi-address space tracing is provided with a plurality of modules configured to functionally execute the steps of establishing a trigger event, monitoring messages, detecting the trigger event, and logging trace data. These modules in the described embodiments include a trigger module, a monitor, a detection module, and a log module.

The trigger module establishes a trigger event with a trace level. The trigger event occurs in at least a first address space of a plurality of address spaces. The trace level defines trace data to be stored from the plurality of address spaces.

The monitor monitors messages communicated within and between the plurality of address spaces. The detection module detects the trigger event. The log module logs the trace data from the plurality of address spaces defined by the trace level in response to detecting the trigger event.

A system of the present invention is also presented for multi-address space tracing. The system may be embodied in a data processing system. In particular, the system, in one embodiment, includes a plurality of address spaces and a first computer. The first computer includes a trigger module, a monitor, a detection module, and a log module.

Each address space comprises a unique file system. The trigger module establishes a trigger event with a trace level. The trigger event occurs in at least a first address space of a plurality of address spaces. The trace level defines trace data to be stored from the plurality of address spaces.

The monitor monitors messages communicated within and between the plurality of address spaces. The detection module detects the trigger event. The log module logs the trace data from the plurality of address spaces defined by the trace level in response to detecting the trigger event.

A method of the present invention is also presented for multi-address space tracing. The method in the disclosed embodiments substantially includes the steps to carry out the functions presented above with respect to the operation of the described apparatus and system. In one embodiment, the method includes establishing a trigger event, monitoring messages, detecting the trigger event, and logging trace data.

A trigger module establishes a trigger event with a trace level. The trigger event occurs in at least a first address space of a plurality of address spaces. The trace level defines trace data to be stored from the plurality of address spaces.

A monitor monitors messages communicated within and between the plurality of address spaces. A detection module detects the trigger event. A log module logs the trace data from the plurality of address spaces defined by the trace level in response to detecting the trigger event.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention logs trace data for multiple address spaces. In addition, a trigger event for logging the trace data may occur in at least one address space of the multiple address spaces. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
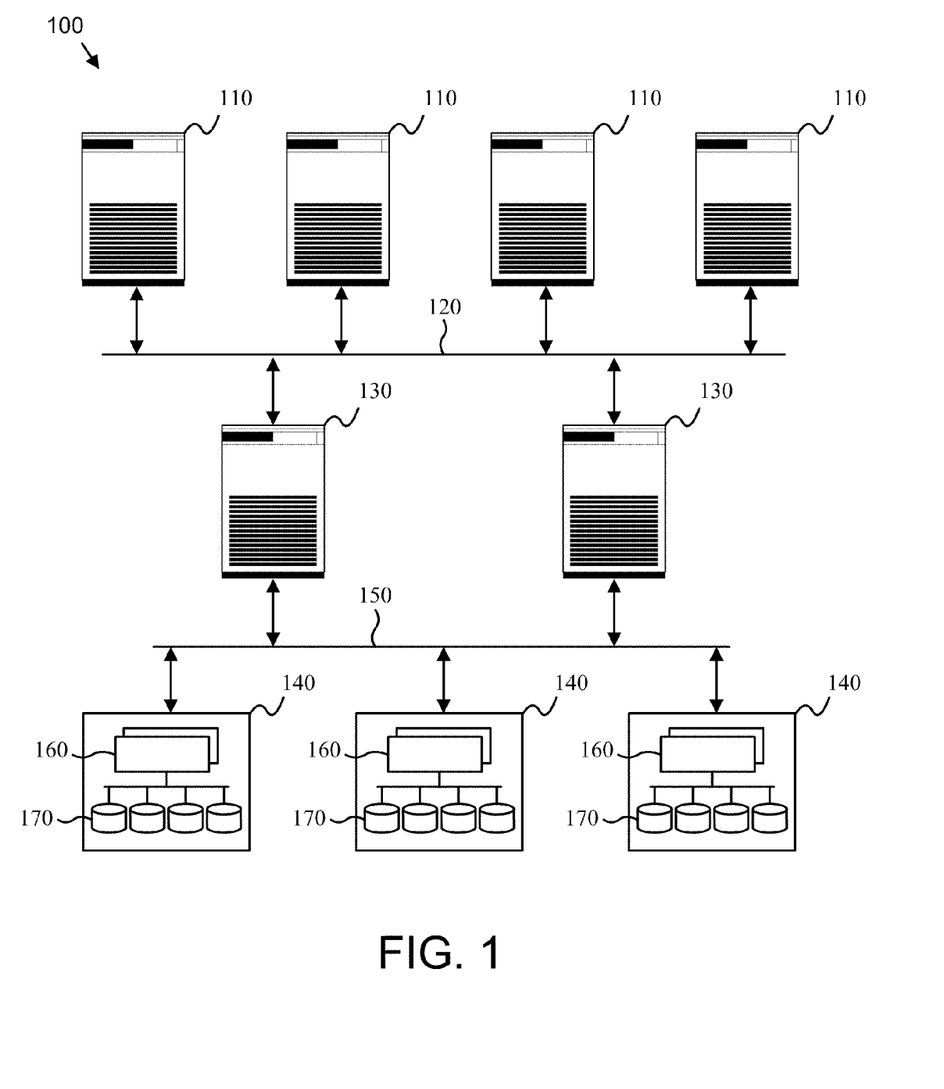
FIG. 1 is a schematic block diagram illustrating one embodiment of a data processing system in accordance with the present invention.

FIG. 1 is a schematic block diagram illustrating one embodiment of a data processing system (DPS) 100 in accordance with the present invention. The DPS 100 includes one or more host computers 110, a network 120, one or more servers 130, a storage communications channel 150, and one or more storage subsystems 140.

As used herein, the host computers 110 are referred to as hosts 110. The hosts 110 may be configured as mainframe computers, blade centers comprising multiple blade servers, and the like. The servers 130 may also be configured as mainframe computers, blade centers comprising multiple blade servers, and the like. Although for simplicity four hosts 110, one network 120, two servers 130, one storage communications channel 150, and three storage subsystems 140 are shown, any number of hosts 110, networks 120, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, an automated tape library, a compact disk read only memory (CD ROM) library, and the like.

In one embodiment, the DPS 100 provides data storage and data manipulation services for the hosts 110. For example, a host 110 may access data stored on a storage device 170 of a storage subsystem 140 by communicating a request through the network 120, a server 130, and the storage communications channel 150 to a storage controller 160 for the storage device 170. The storage controller 160 may retrieve the data from the storage device 170 and communicate the data to the host 110.

The network 120 connecting the hosts 110 and the servers 130 may be selected from a local area network (LAN), a wide area network (WAN), the Internet, an Ethernet network, a token ring network, or the like. The network 120 may comprise one or more nodes that may provide one or more physical and/or logical paths for transferring the data. The storage communications channel 150 may be for example a LAN, a WAN, a Fibre Channel network, or the like.

The DPS 100 includes a plurality of address spaces. Each address space may comprise a range of discrete addresses. An address space may be assigned to a kernel of an operating system. In addition, another address space may be assigned to the operating system. In one embodiment, an address space includes a unique file system. In an alternate embodiment, an address space may comprise the addresses of one or more ports and/or communication registers on a communication device such as a bridge and/or a router.

Figure 2:
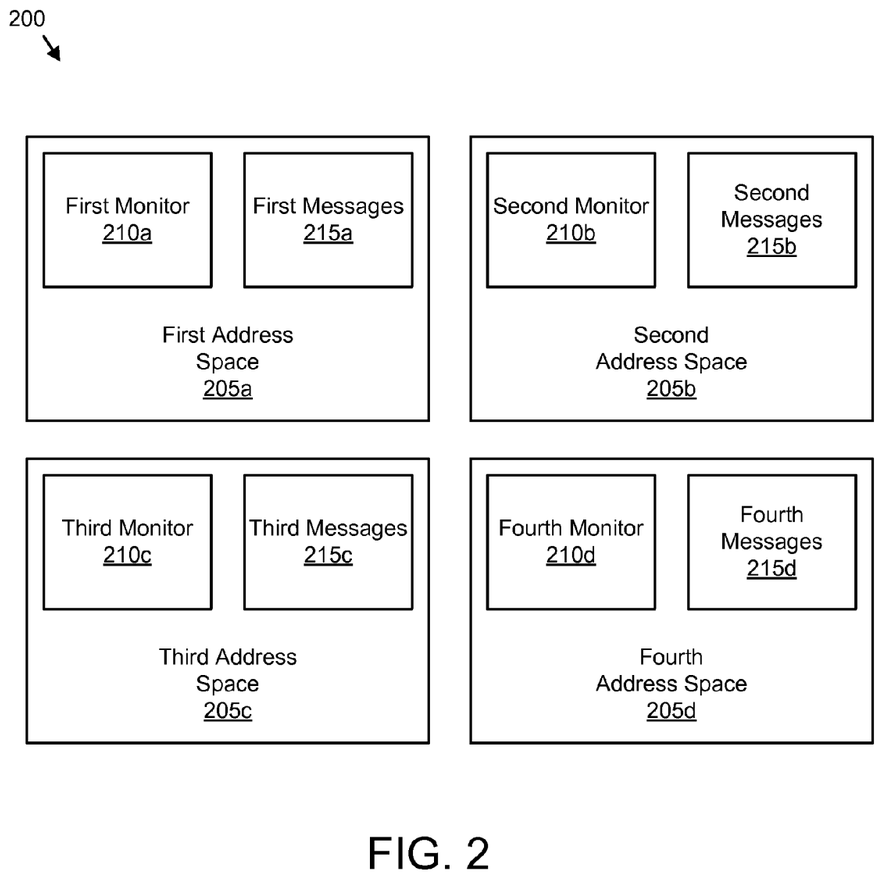
FIG. 2 is a schematic block diagram illustrating one embodiment of address spaces of the present invention.

FIG. 2 is a schematic block diagram illustrating one embodiment of multiple address spaces 200 of the present invention. The multiple address spaces 200 may be embodied in the hosts 110, servers 130, and storage controllers 160 of FIG. 1. The description of the multiple address spaces 200 refers to elements of FIG. 1, like numbers referring to like elements. For simplicity, the multiple address spaces 200 are depicted with four address spaces 205. However, one of skill in the art will recognize that the present invention may be practiced with any number of address spaces 205.

Each address space 205 may comprise a range of addresses in one or more of memory devices. The memory devices may include semiconductor memory devices such as Dynamic Random Access Memory (DRAM), a Flash Random Access Memory (RAM), a hard disk drive, and optical storage device, or the like. In one embodiment, the range of addresses are contiguous. Alternatively, the range of addresses may comprise a plurality of contiguous address range groups wherein the groups are not contiguous. In one embodiment, an address space may be dynamically moved between one or more memory devices. For example, the memory space may be dynamically moved between DRAM and a hard disk drive.

The multiple address spaces 200 may be organized to allow the address spaces 205 of the DPS 100 to balance workloads between the address spaces 205, to share data between the address spaces 205, and the like. In one embodiment, the address spaces 205 support parallel processing. For example, the first address space 205a and a second address space 205b may each perform functions for a software process in parallel. The multiple address spaces 200 may facilitate the sharing of a workload between the first and second address spaces 205a-b. In addition, the multiple address spaces 200 may support the sharing of data between the first and second address spaces 205a-b. In one embodiment, the multiple address spaces 200 are embodied in a Z/OS® Sysplex manufactured by International Business Machines Corporation (IBM) of Armonk, N.Y.

In one embodiment, each address space 205 generates messages 215. The messages 215 may include Input/Output (I/O) error messages, I/O delay messages, hang messages, loop messages, abends messages, and recovery messages. In one embodiment, an I/O error message comprises information about the failed I/O transaction. For example, a storage controller 160 may generate an I/O error message if a storage controller 160 is unable to write data to a storage device 170. In one embodiment, the I/O error message includes an identifier for the transaction, an identifier for logical volume, a storage device identifier, and code indicating a type of error.

An I/O delay message may indicate that access to a storage device 170 is delayed. For example, the storage controller 160 may generate an I/O delay message if a read from the storage device 170 is delayed by more than a specified time interval. The I/O delay message may indicate the storage device 170 that is delayed. The storage device 170 may be indicated by a storage device identifier. In addition, the I/O delay message may include an identifier for the transaction.

A hang message may indicate a device such as a host 110, a server 130, a storage controller 160, or the like is not functioning normally. For example, a hang message may indicate a host 110 is not responding to communications. In one embodiment, the hang message includes an identifier for the hung device. In a certain embodiment, the hang message includes a description of the communications that are attempted with the hung device. For example, the hang message may include a time stamp, a "communications failed" descriptor, a device identifier, and the like.

In one embodiment, a loop message is a message posted by an operating system to a main application thread. For example, the operating system may post a loop message indicating that a service requested by the main application thread is completed. Thus if the main application thread requested that the operating system store data to a storage device 170, the operating system main post a loop message indicating at the data is stored to the storage device 170.

An abends message may describe an abnormal termination of a software process. For example, if the thread that stores data to a storage device 170 abnormally terminates, and an abends message may be generated. The abends message may describe the software process. In addition, the abends message may include identifiers for the devices executing the software process. For example, if the server 130 is executing a backup thread, the server 130 may generate an abends message if the backup thread crashes with a backup thread identifier, a storage device identifier, a path identifier, and a time stamp.

In one embodiment, the recovery message describes a recovery from a previous failure. For example, if a storage device 170 fails to receive and store data, the storage controller 160 may post an I/O error message. If the storage controller 160 retries storing the data to the storage device 170 and succeeds in storing the data, the storage controller 160 may post a recovery message.

In one embodiment, each address space 205 includes a monitor 210. The monitor 210 may monitor the messages 215 as will be described hereafter. In one embodiment, each monitor 210 monitors messages 215 that are generated within the monitor's address space 205. For example, a first monitor 210a may monitor an I/O delay message of the first messages 215a generated within a first address space 205a.

In addition, each monitor 210 may monitor messages 215 that are communicated between address spaces 205. For example, a first monitor 210a may monitor an abends message of second message 215b communicated between a second address space 205b and the first address space 205a.

Figure 3:
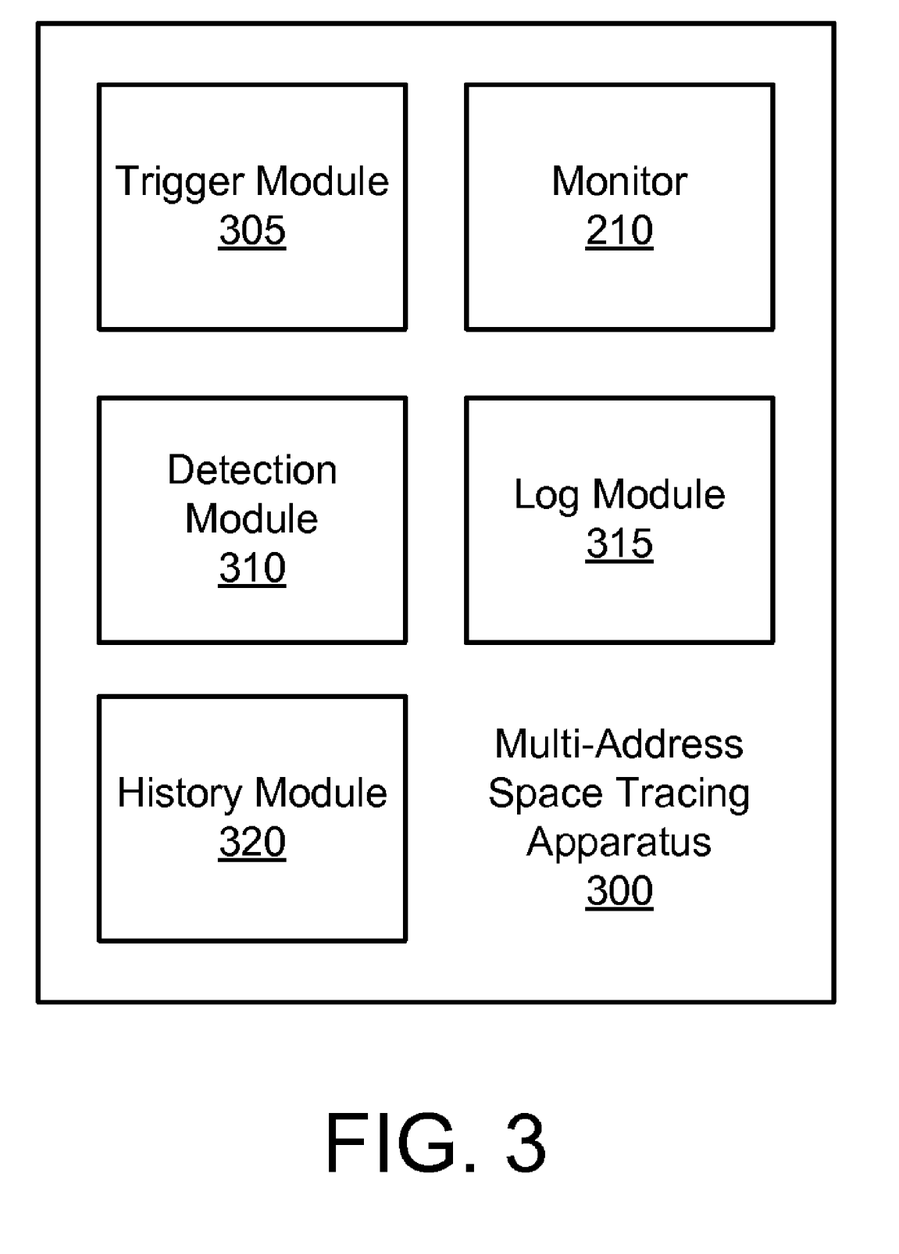
FIG. 3 is a schematic block diagram illustrating one embodiment of a multi-address space tracing apparatus of the present invention.

FIG. 3 is a schematic block diagram illustrating one embodiment of a multi-address space tracing apparatus 300 of the present invention. The apparatus 300 may be embodied in one or more devices, such as the hosts 110, the servers 130, and the storage controllers 160, of the DPS 100 of FIG. 1. For example, the apparatus 300 may be embodied in a server 130 of FIG. 1. Alternatively, the apparatus 300 may be distributed across a plurality of devices. For example, the apparatus 300 may be distributed to one or more hosts 110, one or more servers 130, and one or more storage controllers 160.

The description of the apparatus 300 refers to elements of FIGS. 1-2, like numbers referring to like elements. The apparatus 300 includes a trigger module 305, a monitor 210, a detection module 310, log module 315, and a history module 320.

The trigger module 305, the monitor module 210, the detection module 310, the log module 315, and the history module 320 may be embodied in a computer program product. The computer program product may comprise a computer readable program that is stored on a tangible storage device such as a DRAM memory or hard disk drive storage device 170. The computer readable program may be executed by a computer such as a host 110, a server 130, and/or a storage controller 160. In one embodiment, the computer readable program is executed by a processor of a host 110, a server 130, and/or a storage controller 160 as is well known to those skilled in the art.

The trigger module 305 establishes a trigger event with a trace level. The trigger event occurs in at least a first address space 205a of a plurality of address spaces 205. For example, the trigger event may comprise an I/O error message of the first messages 215a of the first address space 205a. In one embodiment, the trigger event comprises at least first and second messages 215a-b of the first and second address spaces 205a-b. For example, the trigger event may comprise an I/O error message of the first messages 215a of the first address space 205a and an abends message of the second messages 215b of the second address space 205b.

The trace level defines trace data to be stored from the plurality of address spaces 205. For example, the trace level may specify that each transaction to a first storage device 170 related to a fourth address space 205d be recorded. In addition, the trace level may specify that each transaction of a first storage controller 160 also be recorded.

The monitor 210 monitors messages communicated within and between the plurality of address spaces 205. In one embodiment, the monitor 210 includes a listener. The listener may parse data that is communicated through one or more specified ports. Alternatively, the listener may parse data as it is communicated between one or more specified software threads. The listener may identify specified keywords, codes, and the like in messages 215. In an alternate embodiment, the listener may identify specified keywords, codes, and the like in all communications through the specified ports and/or involving the specified software threads.

The monitors 210 may communicate messages 215 between the address spaces 205. For example, the first monitor 210a may forward the first messages 215a to the second monitor 210b in the second address space 205b. In addition, the second monitor 210b may forward second messages 215b to the first monitor 210a. Thus each monitor 210 may have access to messages 215 that are generated outside of the monitor's address space 205.

The detection module 310 detects the trigger event. In one embodiment, the detection module 310 maintains a trigger table that lists each event that comprises the trigger event. For example, the trigger event may comprise an I/O error message posted with the first messages 215a of the first address space 205a and a recovery message posted with the third messages 215c of a third address space 205c. The trigger table may further record events that conform to the events comprising the trigger event. For example, the trigger table may list each I/O error message posted in the first address space 205 and each recovery message posted in the third address space 205c.

In one embodiment, the trigger table further specifies a relationship between each event comprising the trigger event. Continuing the example above, the trigger table may specify that an I/O error message and a recovery message are posted within 30 seconds of each other in order to activate the trigger event.

The log module 315 logs the trace data from the plurality of address spaces 205 defined by the trace level in response to detecting the trigger event. In one embodiment, the log module 315 allocates a storage space for the trace data. The storage space may be on a nonvolatile storage device 170, the memory of a computer such as a server 130 or a host 110, or the like. In addition, the log module 315 may log messages 215 to the allocated storage space.

The trace data may be a storage dump, a branch trace, and instruction trace, an enabling component trace, and a system services trace. In one embodiment, the storage dump comprises the contents and corresponding addresses of a storage space for a transaction. In a prophetic example, a storage controller 160 may attempt to write a data block to a hard disk drive storage device 170. If the write fails, the storage controller 160 may generate an I/O error message. If the I/O error message is a trigger event, the detection module 310 may detect the I/O error message trigger event. In response, the log module 315 may log the trace data specified by the trace level for the I/O error message trigger event. The trace data for the event may comprise the contents of one or more hard disk tracks of the storage device 170 to which the write was directed.

The branch trace may comprise a list of each process executed by a computer such as a host 110, a server 130, and/or a storage controller 160 during a specified time interval. Continuing the example above, the branch trace may list each identifier for each process that executed on the storage controller 164 a specified time interval before and after the I/O error message is generated.

In one embodiment, the instruction trace may comprise each instruction executed by a computer such as a host 110, a server 130, and/or a storage controller 160 during a specified time interval. Continuing the example above, the instruction trace may include each instruction executed by the storage controller 160 for a specified time interval before and/or after the generation of the I/O error message. In an alternate embodiment, the instruction trace may comprise each command communicated between address spaces 205.

The enabling component trace may include all messages generated by a specified component. The specified component may enable a transaction. For example, a storage device 170 may enable a read for a storage controller 160. Alternatively, the enabling component trace may record all bus activity for a bus of the specified component. For example, the enabling component trace may record each communication over a Fiber Channel bus to a storage device 170.

In one embodiment, the system services trace comprises information on services provided to an address space 205 by one or more devices in the DPS 100. In a prophetic example, the storage controllers 160 may provide storage access services to the server's 130. The system services trace may comprise each request for a storage service communicated to the storage controllers 160 and each acknowledgment for the service communicated to the server 130 from the storage controllers 160.

In one embodiment, the history module 320 stores a job history for a specified job. In one embodiment, each job includes a Job Control Language (JCL) identifier. Upon detecting the specified job, the history module 320 may record information relating to the specified job. For example, the history module 320 may record a start time and an end time for the specified job. In addition, the history module 320 may record the resources that are used by the specified job. The resources may include address spaces 205, devices such as servers 130, storage controllers 160, and storage devices 170, application threads, and the like. The history module 320 may further calculate data for the specified job. For example, the history module 320 may calculate a runtime for the specified job.

Figure 4:
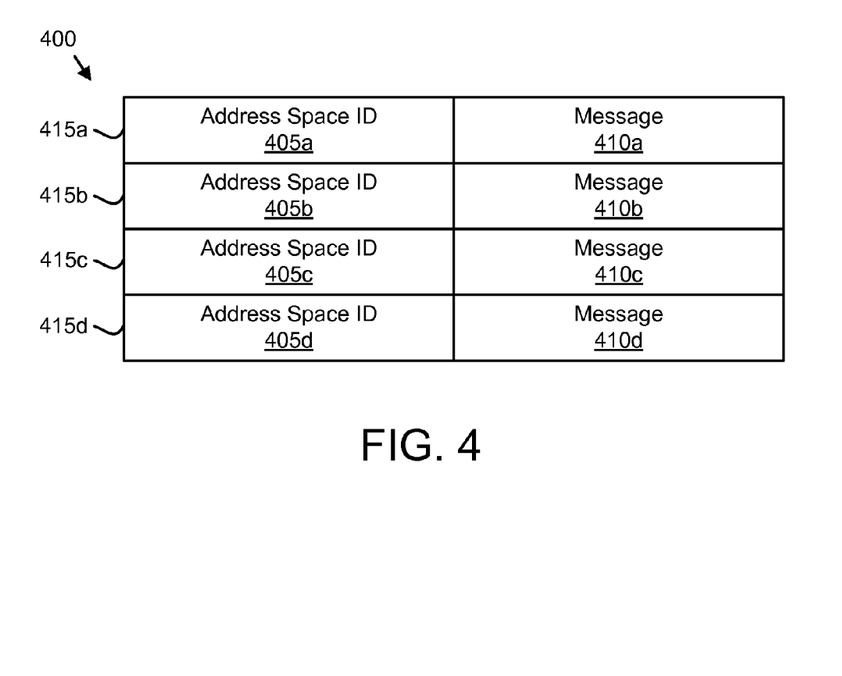
FIG. 4 is a schematic block diagram illustrating one embodiment of logged messages of the present invention.

FIG. 4 is a schematic block diagram illustrating one embodiment of logged messages 40 of the present invention. The messages 400 may include one or more of the messages 215 of FIG. 2. The description of the messages 400 refers to elements of FIGS. 1-3, like numbers referring to like elements. The messages 400 are illustrated organized in a data structure. One of skill the art will recognize that the messages 400 may be organized in other ways, such as in a flat file, a linked list, links data structures, a table, and the like. Although for simplicity four messages 415 are depicted, any number of messages 415 may be employed.

Each logged message 415 comprises an address space identifier 405 and a message 410. The address space identifier 405 may identify the address space 205 that generated the message 410. In one embodiment, the address space identifier 405 is a Z/OS® Address Space Identifier (ASID). The address space identifier 405 allows the differentiation between similar messages 410 received from different address spaces 205. For example, the address space identifier 405 may distinguish between I/O error messages from the first and second address spaces 205a-b.

In one embodiment, each logged message 410 comprises the entirety of one or more messages 215 generated by an address space 205. Alternatively, each logged message 415 comprises a redacted version of the message 215 generated by the address space 205. For example, the log module 315 may parse a message 215 for specified data fields, character strings, and the like. The log module 315 may store the parsed data as a log message 415.

Figure 5:
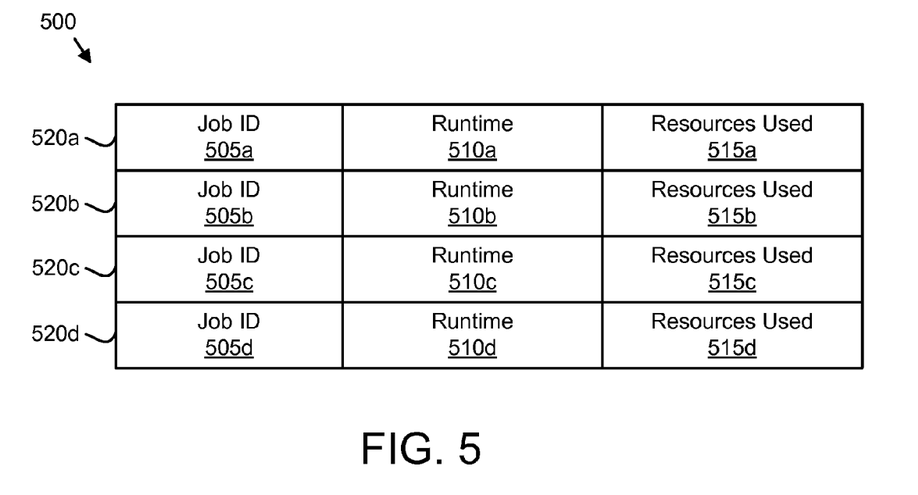
FIG. 5 is a schematic block diagram illustrating one embodiment of a job history of the present invention.

FIG. 5 is a schematic block diagram illustrating one embodiment of a job history 500 of the present invention. The job history 500 may be stored by the job history module 320. The description of the job history 500 refers to elements of FIGS. 1-4, like numbers referring to like elements.

The job history 500 includes a plurality of job history entries 520. Although for simplicity four job history entries 520 are shown, any number of job history entries 520 may be employed. Each job history entry 520 includes a job identifier 505, a runtime 510, and resources used 515. The job identifier 505 may identify a specified job. In one embodiment, the job identifier 505 is a JCL identifier.

The runtime 510 may specify a time interval for which the specified job executed on a computer. In one embodiment, the runtime 510 comprises a start time and an end time. Alternatively, the runtime 510 may be measured in seconds, minutes, or the like. In a certain embodiment, the runtime 510 is measured in a number of instruction cycles.

The resources used 515 may specify one or more resources used by the specified job. The resources may include application threads, operating systems, address spaces 205, and devices such as hosts computers 110, servers 130, and storage subsystems 140. In addition, the resources may include logical partitions, such as logical volumes, virtual computers, virtual storage devices, and the like.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
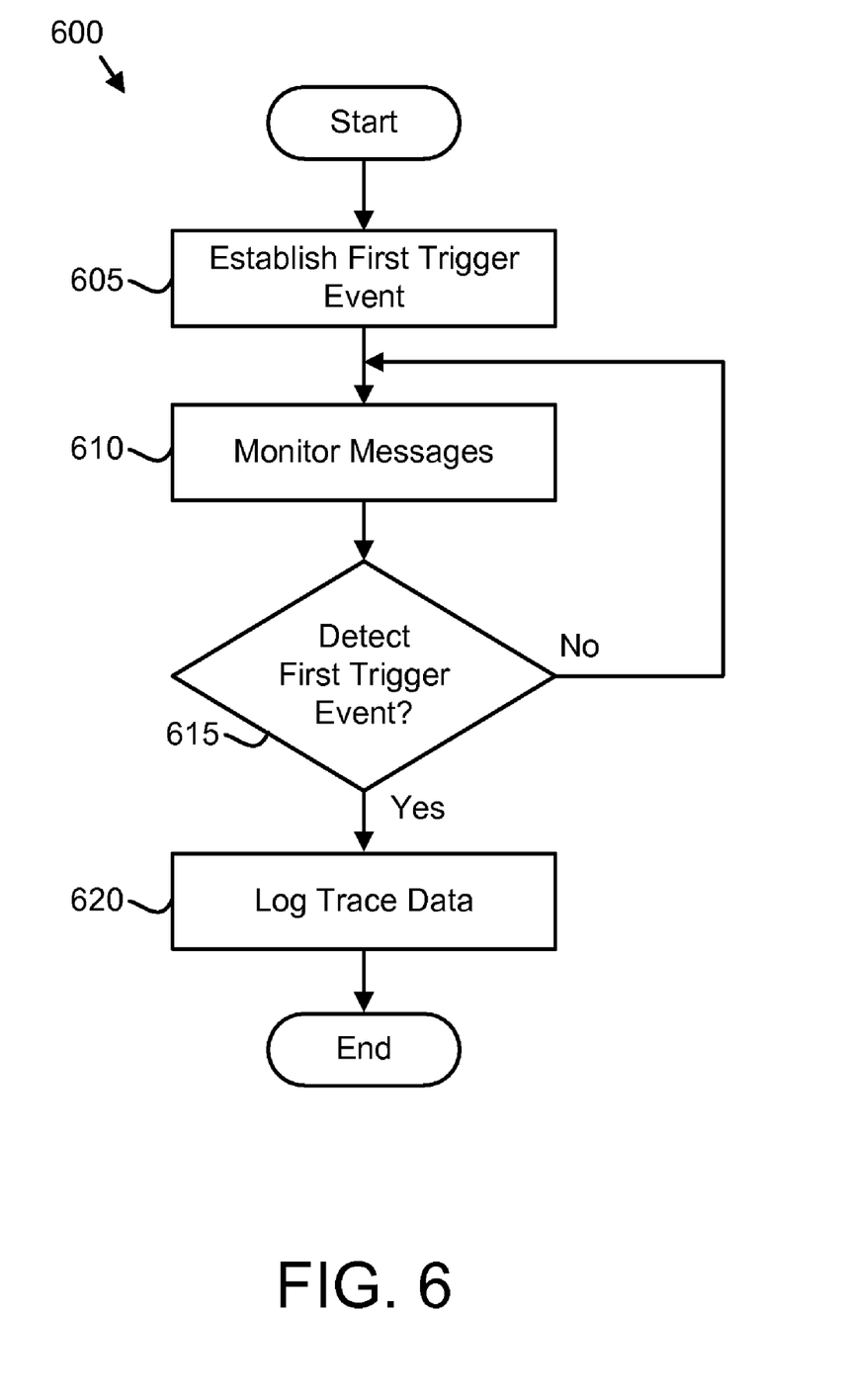
FIG. 6 is a schematic flow chart diagram illustrating one embodiment of a multi-address space tracing method of the present invention.

FIG. 6 is a schematic flow chart diagram illustrating one embodiment of a multi-address space tracing method 600 of the present invention. The method 600 substantially includes the steps to carry out the functions presented above with respect to the operation of the described apparatus 300, system 100, 200, and elements 400, 500 of FIGS. 1-5. In one embodiment, the method 600 is implemented with a computer program product comprising a computer readable medium having a computer readable program. The computer readable program may be integrated into a computing system, such as the host computers 110, the servers 130, and/or the storage controllers 160, wherein the program executing on the computing system performs the method 600.

The trigger module 305 establishes 605 a trigger event with a trace level. The trigger event occurs in at least a first address space 205 of a plurality of address spaces 205. In one embodiment, the trigger event comprises one or more communication directives. Each communication directive may direct a monitor 210 in an address space 205 to forward one or more messages 215 from the address space 205 to a specified monitor 210. For example, a communication directive may direct a third monitor 210c to forward each abends message of the messages 215 of the third address space 205c to the first monitor 210a.

The communication directives may be communicated to the appropriate monitors 210 in each address space 205 to establish the trigger event. The trigger module 205 may also create trigger tables for each monitor 210 to establish 605 the trigger event. The establishment 605 of the trigger event supports subsequent monitoring and detection of the trigger event across the plurality of address spaces 205. Thus the trigger event characterized by events in multiple address spaces 205 may be detected.

The trace level defines trace data to be stored from the plurality of address spaces 205. In one embodiment, the trace level includes commands that are to be communicated to one or more computers in one or more address spaces 205. The commands may direct the computers to begin gathering specified data. Alternatively, the commands may direct the computers to execute one or more specified functions that gather the specified data. For example, a command may direct a storage controller 160 to collect branch trace data.

The monitor 210 monitors 610 messages 215 communicated within and between the plurality of address spaces 205. In one embodiment, the monitor module 210 monitors all messages 215 within the monitor's own address space 205. A plurality of monitors 210 may monitor 610 messages 215 communicated within and between the plurality of address spaces 205. In addition, the monitor module 210 may receive forwarded messages 215 from other monitor modules 210 in other address spaces 205. Continuing the example above, the first monitor 210a may monitor the messages 215a in the first address space 205a. In addition, the first monitor 210a may monitor messages from the third monitor 210c that are forwarded to the first monitor 210a.

In one embodiment, each forwarded message 215 includes a header that identifies the target monitor 210. In addition, each forwarded message 215 may include a timestamp indicating when the forwarded message 215 was transmitted by the forwarding monitor module 210 and an identifier of the forwarding monitor module 210.

The detection module 310 detects 615 the trigger event. In one embodiment, the detection module 310 scans the logged messages 400. If a combination of logged messages 415 satisfies each condition of the trigger event, the detection module 310 may detect 615 the trigger event. In a prophetic example, the trigger event comprises a specified abends message from the first address space 205a and a specified recovery message from a fourth address space 205d. The first monitor module 210a may monitor 610 and store the specified abends message in the logged message table 400. In addition, the fourth monitor module 210d may forward the specified recovery message from the fourth messages 215d of the fourth address space 205d to the first monitor module 210a. The first monitor module 210a may store the specified recovery message in the logged message table 400.

The detection module 310 may scan the logged message table 400 and find both the specified abends message and the specified recovery message. As a result, the detection module 310 may detect 615 the trigger event. If the detection module 310 does not detect 615 trigger event, the monitor module 210 continues to monitor 610 messages 215.

If the detection module 310 detects 615 the trigger event, the log module 315 logs 620 the trace data from the plurality of address spaces 205 defined by the trace level in response to detecting the trigger event. In one embodiment, the log module 315 transmits the commands for the trace level. The commands may direct one or more devices such as the servers 130, storage controllers 160, and/or storage devices 170 to record and forward the specified trace data to the log module 315. The log module 315 may store the forwarded trace data in an allocated data.

The method 600 supports the establishment 605 of trigger events across multiple address spaces 205. Upon detection 615 of a trigger event, the method 600 also logs trace data from across multiple address spaces 205. An administrator and/or a computer program may use the logged trace data to find software bugs, detect erroneous system configurations, detect hardware failures, predict hardware failures, and the like as is well known to those of skill in the art. Thus, conditions that indicate an error that are spread across multiple address spaces 205 may be detected. In addition, trace data from across the multiple address spaces 205 may be collected and stored.

Figure 7:
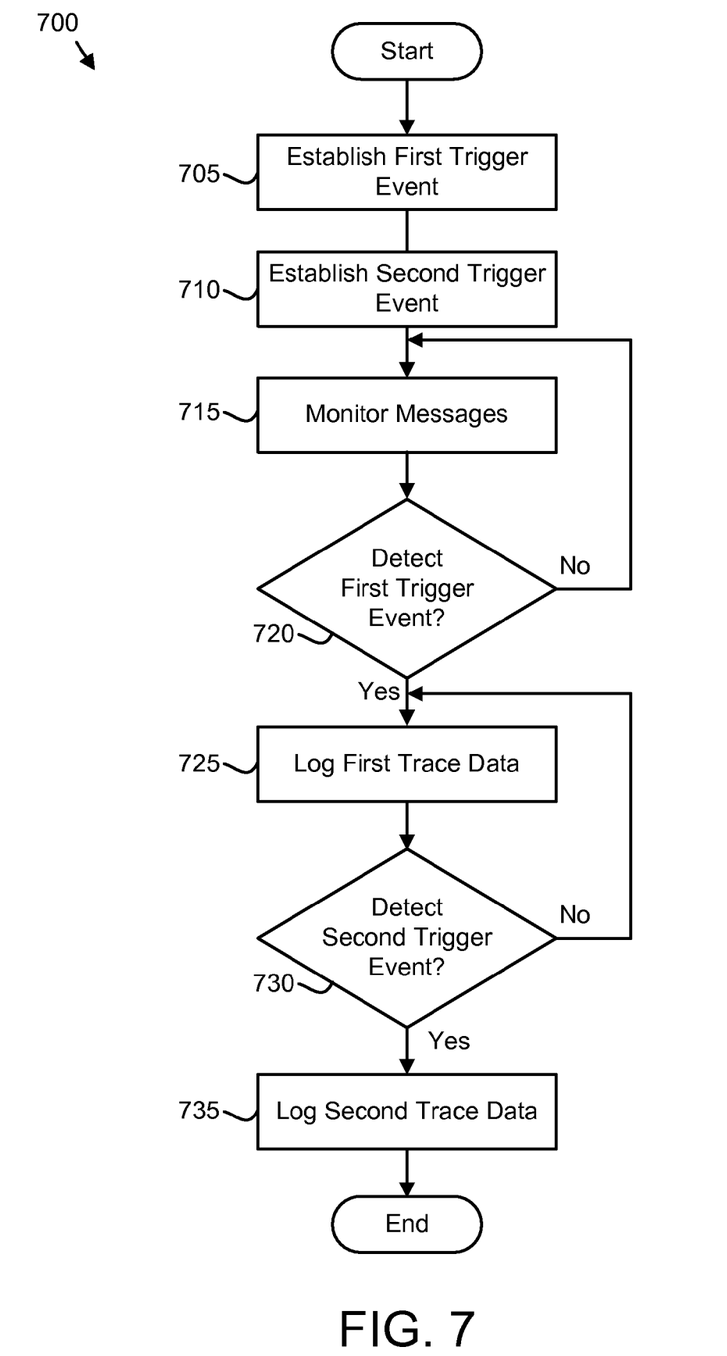
FIG. 7 is a schematic flow chart diagram illustrating one embodiment of a multiple trigger multi-address space tracing method of the present invention.

FIG. 7 is a schematic flow chart diagram illustrating one embodiment of a multiple trigger multi-address space tracing method 700 of the present invention. The method 700 substantially includes the steps to carry out the functions presented above with respect to the operation of the described apparatus 300, system 100, 200, and elements 400, 500 of FIGS. 1-5 and the method 600 of FIG. 6. In one embodiment, the method 700 is implemented with a computer program product comprising a computer readable medium having a computer readable program. The computer readable program may be integrated into a computing system, such as the host computers 110, the servers 130, and/or the storage controllers 160, wherein the program executing on the computing system performs the method 700.

The trigger module 305 establishes 705 a first trigger event with a first trace level as described for step 605 of FIG. 6. In addition, the trigger module 305 establishes 710 a second trigger event with a second trace level. The monitor 210 monitors 715 messages 215 communicated within and between the plurality of address spaces 205 as described for step 610 of FIG. 6.

The detection module 310 detects 720 the first trigger event as described for step 615 of FIG. 6. If the detection module 310 does not detect 720 the first trigger event, the monitor module 210 continues to monitor 715 messages 215.

If the detection module 310 detects 720 the first trigger event, the log module 315 logs 725 the trace data from the plurality of address spaces 205 defined by the first trace level in response to detecting the first trigger event. In a certain embodiment, the first trace level specifies that no trace data be logged.

In addition, the detection module 310 detects 730 the second trigger event. If the detection module 310 does not detect 730 the second trigger event, the log module 315 continues to log 725 the first trace data. In an alternate embodiment, the monitor module 210 may resume monitoring 715 messages 215.

If the detection module 310 detects 730 the second trigger event, the log module 315 logs the second trace data. The method 700 allows trace data to the logged 725 in response to detecting 720 the first trace event and additional trace data to the logged 735 in response to detecting 730 the second trigger event. Thus if the second trigger event occurs, more detailed and/or more directed trace data may be logged 735. The method 700 allows for collecting trace data across a plurality of address spaces 205 in response to sequences of trace events that may occur across a plurality of address spaces 205. Thus trace data of greater specificity and/or detail may be gathered.

The present invention logs trace data for multiple address spaces 205. In addition, a trigger event for logging the trace data may comprise messages 215 from the multiple address spaces 205. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable program for multi-address space tracing stored on a tangible storage device, wherein the computer readable program when executed on a computer causes the computer to:
establish a first trigger event with a first trace level, wherein the first trigger event occurs in at least a first address space of a plurality of address spaces and the first trace level defines trace data to be stored from the plurality of address spaces, each address space comprising a unique file system;
monitor messages communicated within and between the plurality of address spaces;
detect the first trigger event; and
log the trace data from the plurality of address spaces defined by the first trace level in response to detecting the first trigger event.

2. The computer program product of claim 1, wherein the first trigger event is selected from an Input/Output (I/O) error message, an I/O delay message, a hang message, a loop message, an abends message, and a recovery message.

3. The computer program product of claim 1, wherein the computer readable program further causes the computer to store a job history for a specified job.

4. The computer program product of claim 3, wherein the computer readable program further causes the computer to calculate a runtime threshold for the specified job from the job history.

5. The computer program product of claim 4, wherein the first trigger event comprises a job runtime for the specified job that exceeds the runtime threshold.

6. The computer program product of claim 1, wherein the trace data is selected from a storage dump, a branch trace, an instruction trace, an enabling component trace, and a system services trace.

7. The computer program product of claim 1, wherein the first trigger event comprises a storage shortage message.

8. The computer program product of claim 7, wherein the computer readable program further causes the computer to store trace data comprising storage use for at least one address space.

9. The computer program product of claim 1, wherein the computer readable program further causes the computer to:
establish a second trigger event with a second trace level, wherein the second trace level defines additional trace data to be stored from the plurality of address spaces;
detect the second trigger event if the first trigger event is already detected; and
store the additional trace data from the plurality of address spaces defined by the second trace level in response to detecting the second trigger event.

10. An apparatus for multi-address space tracing, the apparatus comprising:
a tangible storage device storing computer readable programs;
a computer executing the computer readable programs, the computer readable programs comprising:
a trigger module establishing a trigger event with a trace level, wherein the trigger event occurs in at least a first address space of a plurality of address spaces and the trace level defines trace data to be stored from the plurality of address spaces, each address space comprising a unique file system;
a monitor monitoring messages communicated within and between the plurality of address spaces;
a detection module detecting the trigger event; and
a log module logging the trace data from the plurality of address spaces defined by the trace level in response to detecting the trigger event.

11. The apparatus of claim 10, the computer readable programs further comprising a history module storing a job history for a specified job.

12. The apparatus of claim 11, the history module further calculating a runtime threshold for the specified job from the job history.

13. The apparatus of claim 12, wherein the trigger event comprises a job runtime for the specified job that exceeds the runtime threshold.

14. A system for multi-address space tracing, the system comprising:

a plurality of address spaces, each address space comprising a unique file system.
a first computer comprising:
  a trigger module establishing a trigger event with a trace level, wherein the trigger event occurs in at least a first address space of the plurality of address spaces and the trace level defines trace data to be stored from the plurality of address spaces;
  a monitor monitoring messages communicated within and between the plurality of address spaces;
  a detection module detecting the trigger event; and
  a log module logging the trace data from the plurality of data spaces defined by the trace level in response to detecting the trigger event.

15. The system of claim 14, wherein the trigger event is selected from an I/O error message, an I/O delay message, a hang message, a loop message, an abends message, and a recovery message.

16. The system of claim 14, wherein the trace data is selected from a storage dump, a branch trace, an instruction trace, an enabling component trace, and a trace of system services.

17. The system of claim 14, wherein the trigger event is a storage shortage message.

18. The system of claim 17, wherein the log module further stores trace data comprising storage use for at least one address space.

19. A method for deploying computer infrastructure, comprising integrating a computer readable program stored on a tangible storage device into a computing system, wherein the program executed by the computing system performs the following:
  establish a trigger event with a trace level, wherein the trigger event occurs in at least a first address space of a plurality of address spaces and the trace level defines trace data to be stored from the plurality of address spaces, each address space comprising a unique file system;
  monitor messages communicated within and between the plurality of address spaces;
  detect the trigger event; and
  log the trace data from the plurality of address spaces defined by the trace level in response to detecting the trigger event.

20. The method of claim 19, the method further comprising storing a job history for a specified job and calculating a runtime threshold for the specified job from the job history, wherein the trigger event comprises a job runtime for the specified job that exceeds the runtime threshold.

\* \* \* \* \*